July 4, 1939.　　　　E. T. BURTON　　　　2,164,383
MAGNETIC DEVICE
Filed Dec. 29, 1934　　　10 Sheets-Sheet 1

INVENTOR
E. T. BURTON
BY
J. W. Schmied
ATTORNEY

INVENTOR
E. T. BURTON
BY
J. W. Schmied
ATTORNEY

July 4, 1939.  E. T. BURTON  2,164,383
MAGNETIC DEVICE
Filed Dec. 29, 1934  10 Sheets-Sheet 3

INVENTOR
E. T. BURTON
BY
J. W. Schmied
ATTORNEY

July 4, 1939.  E. T. BURTON  2,164,383
MAGNETIC DEVICE
Filed Dec. 29, 1934    10 Sheets-Sheet 5

INVENTOR
E.T. BURTON
BY
J. W. Schmied
ATTORNEY

July 4, 1939.　　　　　E. T. BURTON　　　　　2,164,383
MAGNETIC DEVICE
Filed Dec. 29, 1934　　　10 Sheets-Sheet 6
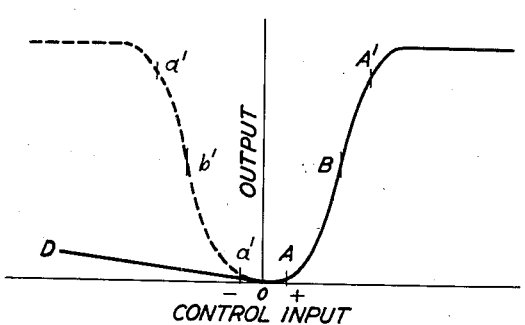
FIG. 12
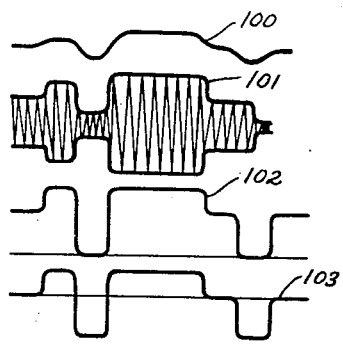
FIG. 13
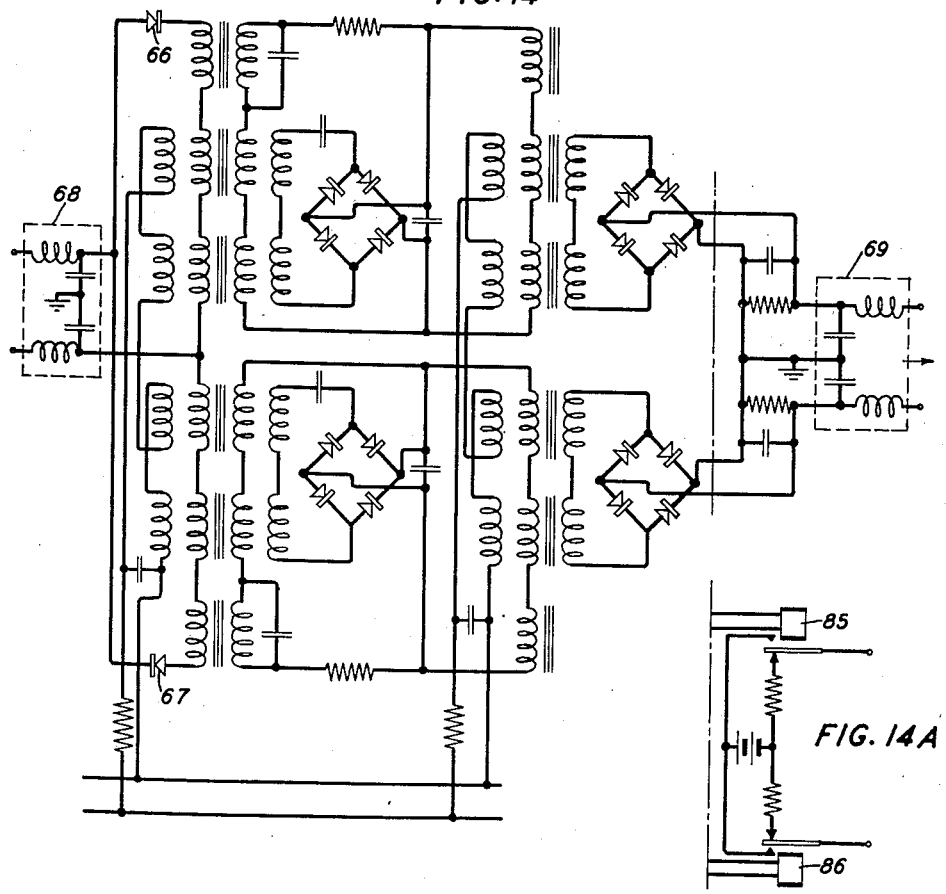
FIG. 14
FIG. 14A
INVENTOR
E.T. BURTON
BY
J. W. Schmied
ATTORNEY

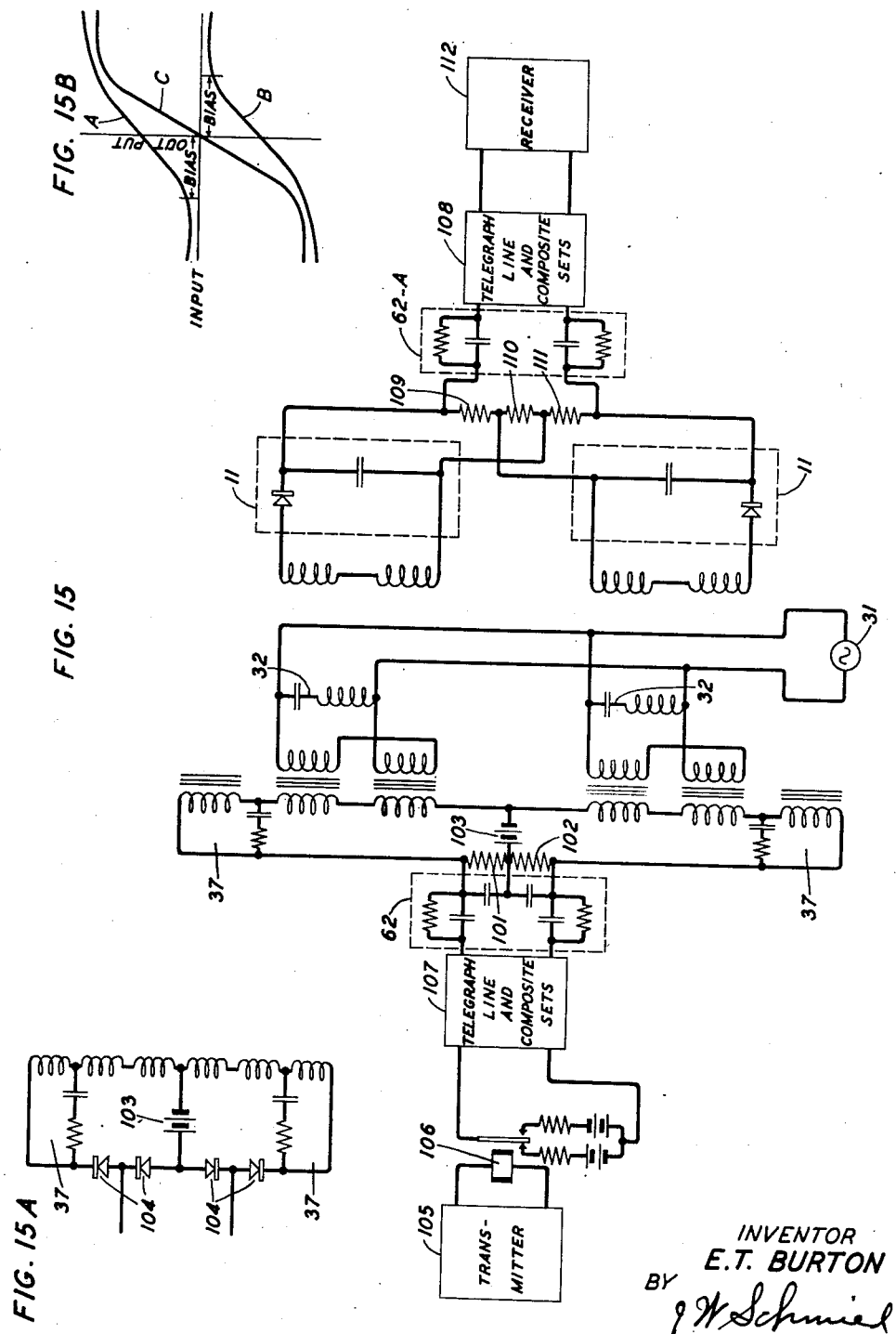

July 4, 1939.   E. T. BURTON   2,164,383
MAGNETIC DEVICE
Filed Dec. 29, 1934   10 Sheets-Sheet 9

INVENTOR
E.T. BURTON
BY
J. W. Schmied
ATTORNEY

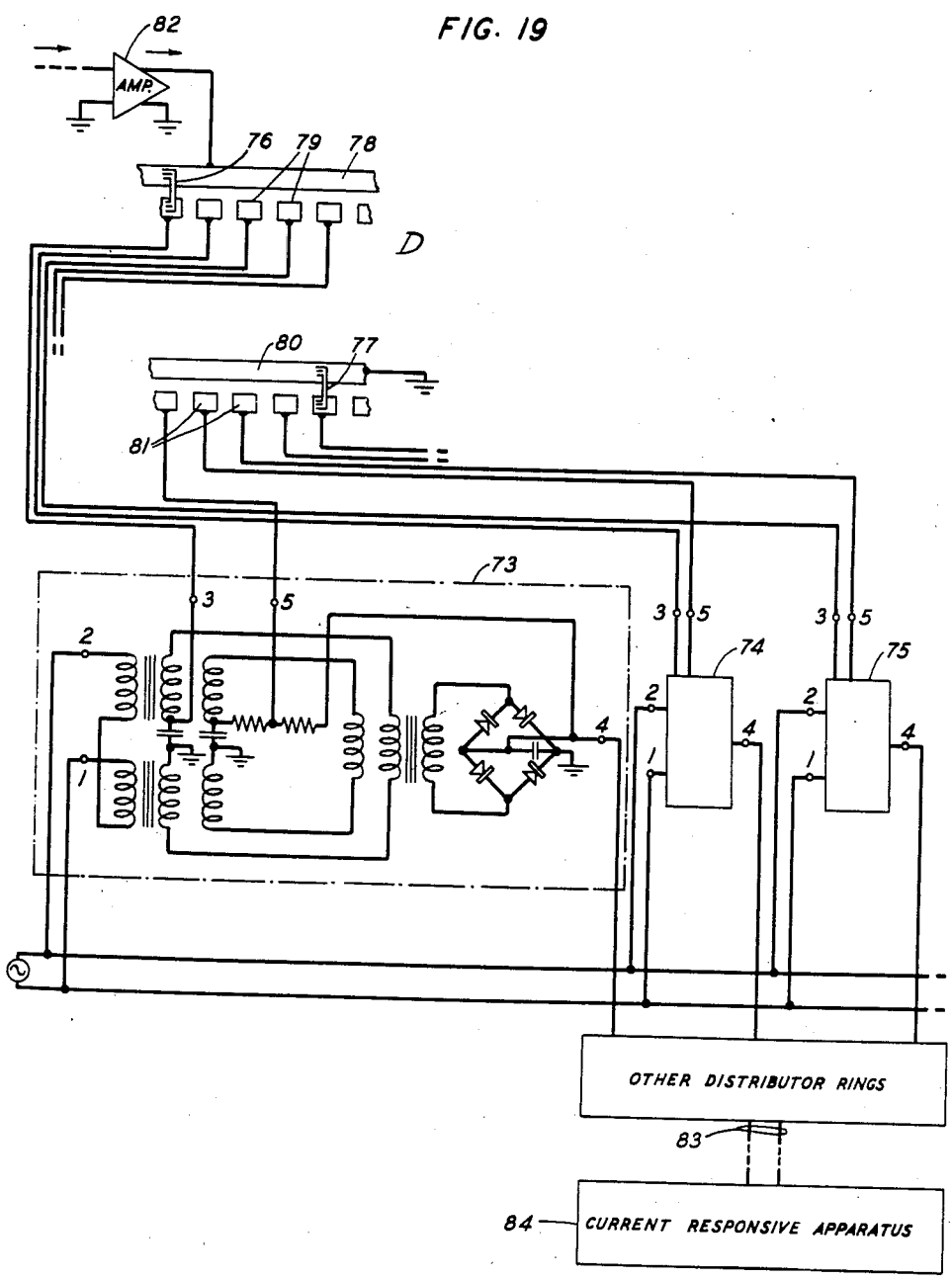

Patented July 4, 1939

2,164,383

UNITED STATES PATENT OFFICE 2,164,383

MAGNETIC DEVICE

Everett T. Burton, Millburn, N. J., assignor to Bell Telephone Laboratories, Incorporated, New York, N. Y., a corporation of New York Application December 29, 1934, Serial No. 759,647

7 Claims. (Cl. 179—171)

This invention relates to magnetic devices and more particularly to magnetic amplifiers for repeating and storing communication signal currents.

An object of this invention is to provide a simple, inexpensive, efficient and compact amplifier for repeating communication signal currents.

A further object is to provide an amplifier which has no moving parts and which has no element which deteriorates appreciably with time.

A feature of the invention resides in the feedback circuit which may be used to increase the gain of the amplifier, to provide a signal impulse storing feature, or when reversed, to increase the stability of the amplifier.

Another feature of the invention provides an automatic volume control or level compensation for these amplifiers.

Still another feature of the invention resides in a suitable core structure and a compact and improved arrangement of the various cores and windings of the amplifier.

Further features of the invention reside in the demodulators, filters and shaping networks employed to increase the stability, gain and frequency range of the amplifiers.

Briefly, the invention provides a magnetic amplifier, or repeater comprising a modulator having considerable modulating gain in combination with a demodulator having only a small demodulating loss, so as to obtain an overall gain. While any suitable reactive modulators which have a considerable modulating gain may be used the preferred modulator comprises a pair of balanced magnetic modulator coils and cores with common input and output windings. When a potential is applied to or a current flows through the input winding the balance between the modulator coils is disturbed so that current flows in the output windings. Currents of modulator origin may be suppressed or increased in either or both the input and output windings by means of suitable reactive networks or filters. When it is desired, feed-back windings may be provided which are connected to the output circuit through a demodulating device so that a portion of the output current is demodulated and flows through the feed-back winding. In order to receive and amplify carrier current signals a demodulator is connected in the input circuit of the modulator. Shaping and filter networks may be provided to improve the gain, frequency range and stability of the amplifier.

These and other objects and features of the invention, as defined in the appended claims, may be more fully understood from the following description of several specific embodiments thereof when read with reference to the attached drawings, in which:

Figure 6:
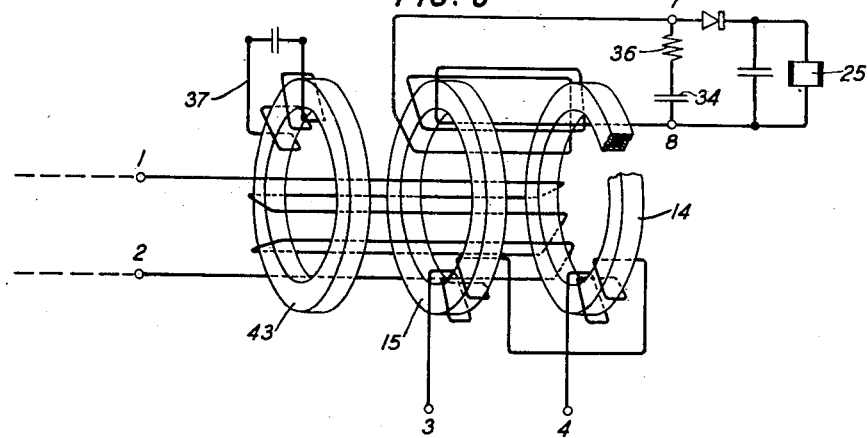
Fig. 6 shows a preferred form and arrangement of the modulator coil which is very compact.

Figs. 7, 7A, 7B, and 7C illustrate details of the preferred structure of the cores of Fig. 6.

Figure 8:
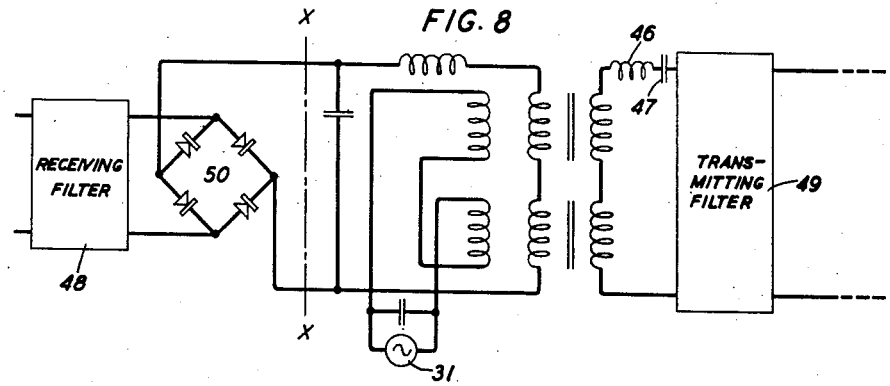
Figure 8A:
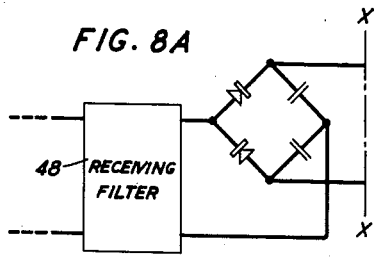
Figure 8B:
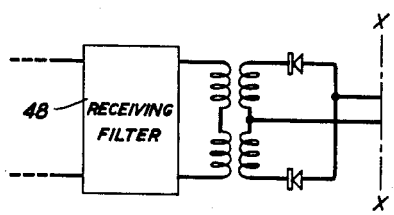
Figure 9:
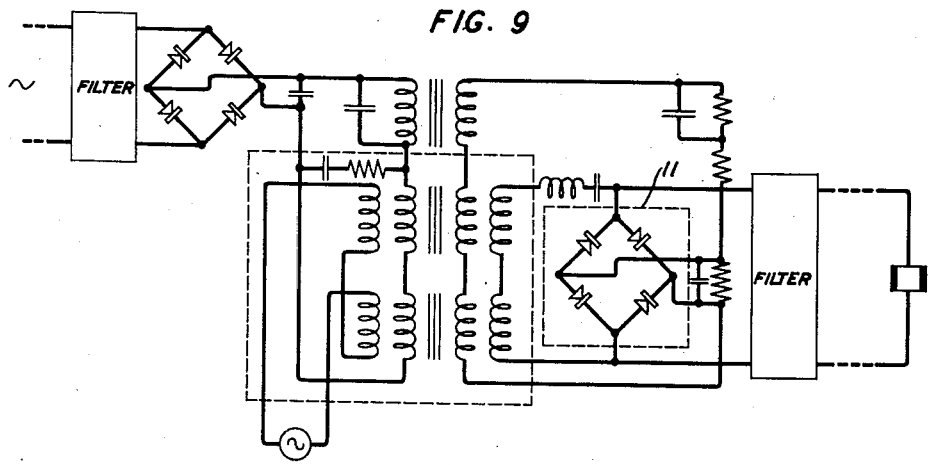
Figure 10:
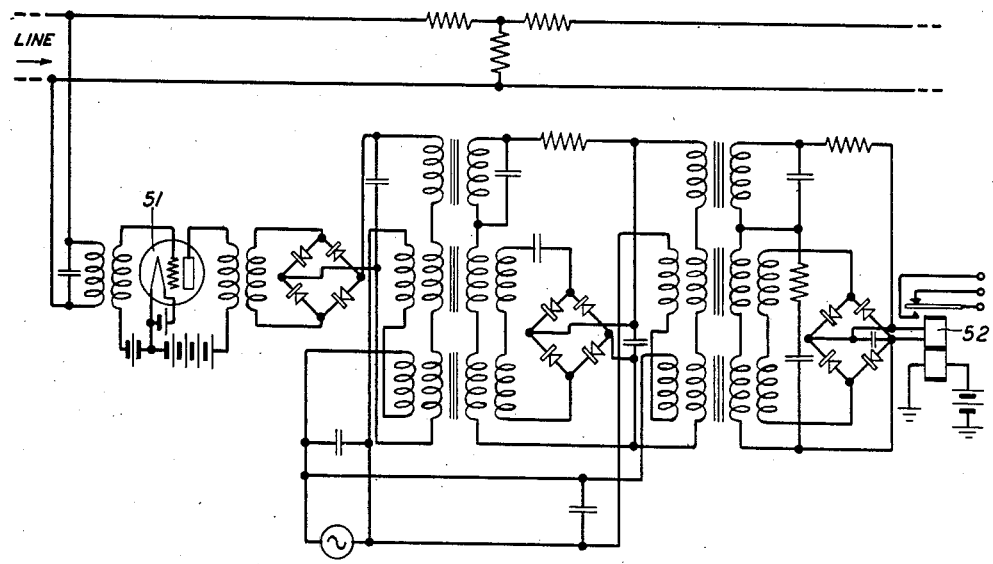
Figure 11:
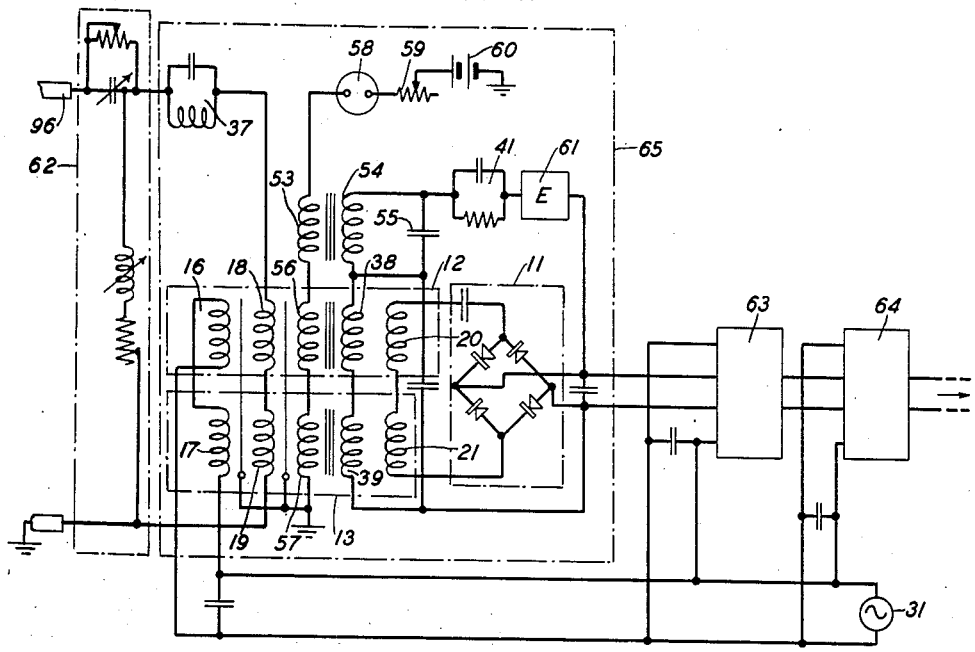
Figure 16:
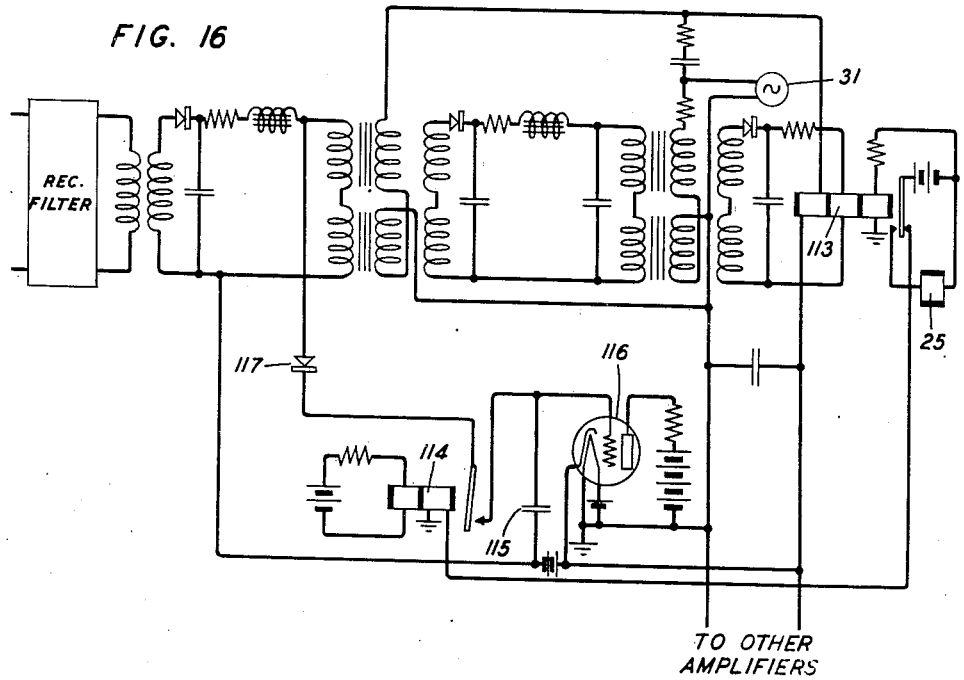
Figure 16A:
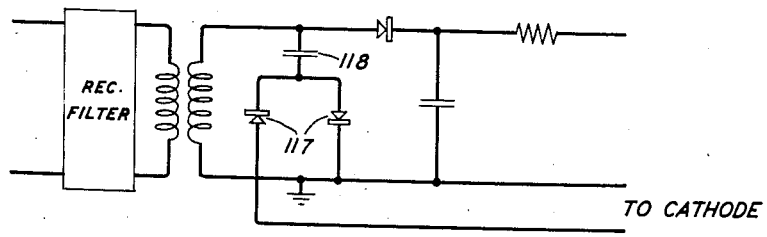

Figs. 8, 8A, and 8B show various arrangements for adapting the input circuit of the modulator to receive carrier current signal impulses;

Fig. 9 shows a preferred form of feed-back arrangements for a carrier current amplifier;

Fig. 10 shows a two-stage magnetic amplifier in combination with a preliminary vacuum tube amplifier;

Fig. 11 shows a magnetic amplifier adapted to receive polar telegraph signal impulses;

Figs. 12 and 13 show curves used to explain the operation of Figs. 11 and 14;

Figs. 14 and 14A show another arrangement for repeating polar telegraph signals which is somewhat more stable than the arrangement shown in Fig. 11;

Figs. 15, 15A and 15B illustrate details of a preferred amplifier for use in metallic telegraph systems employing cables;

Figs. 16 and 16A show arrangements for providing automatic volume control or level compensation in a carrier current amplifier.

Figure 17:
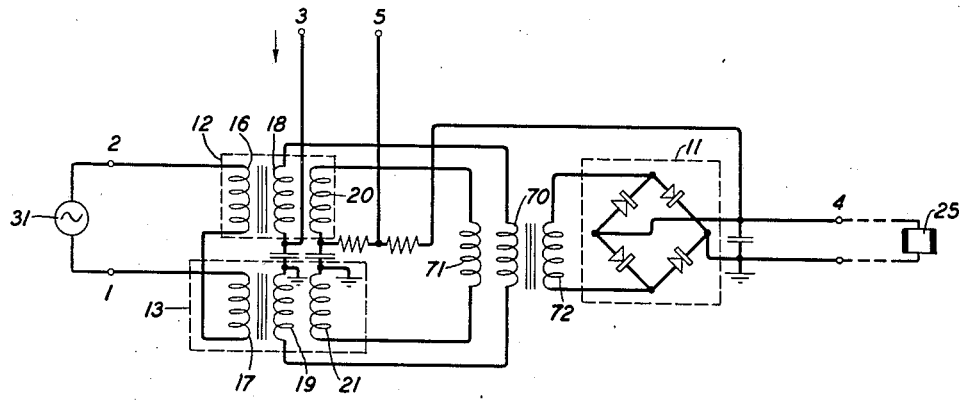
Figure 18:
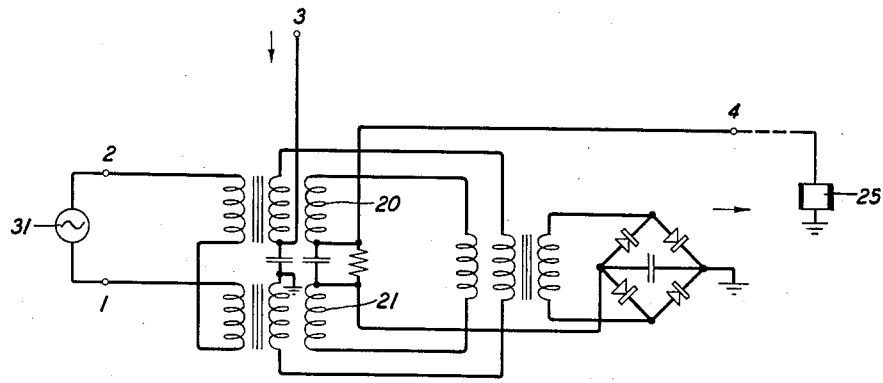

Fig. 17 shows a circuit arrangement of the magnetic amplifier adapted to store telegraph signal impulses;

Fig. 18 shows another arrangement for storing telegraph signal impulses; and

Fig. 19 shows the storing arrangement of Fig. 17 in combination with a telegraph distributor for receiving and regenerating telegraph signal impulses.

The novel features of the magnetic storing arrangements described in this specification and shown in Figs. 17, 18 and 19 are claimed in my copending divisional application Serial No. 113,791, filed December 2, 1936.

Figure 1:
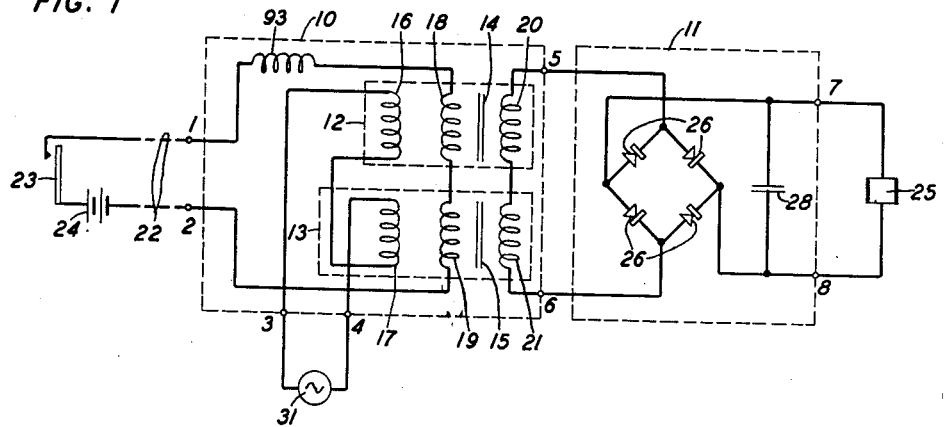
Fig. 1 shows the elements of a representative amplifier.

The manner of operation of the amplifier will now be described with reference to Fig. 1. In this figure 23 represents a source of telegraph signals which are caused to flow over telegraph line 22 to the magnetic amplifier shown in Fig. 1. The coils shown within the dotted line 10 illustrate a suitable magnetic modulator while the copper oxide rectifiers 26 and condenser 28 shown within the dotted line 11 comprises a suitable demodulator. A signal responsive device 25 is shown connected to the output circuit of demodulator 11. While this amplifier is shown connected to a telegraph line it is to be understood that it may be used to amplify other signal currents or current variations as, for example, the input terminals 1 and 2 may be connected to the galvanometer terminals of a direct current bridge or to some recording instrument, the current variations of which it is desired to amplify.

The magnetic modulator 10 comprises two coils 12 and 13 each having three windings 16, 18, and 20 and 17, 19, and 21 wound on cores 14 and 15 respectively. The two power windings 16 and 17 are connected to a source of alternating current 31. In the preferred embodiment of this invention these power windings are so related to the source of alternating current 31 and the cores 14 and 15 that the current flowing through them from the source 31 saturates each of the cores during a portion of each half cycle. Control windings 18 and 19 are connected to the input terminals 1 and 2 through a retard inductance 93. Output windings 20 and 21 are connected to demodulator 11. These windings are connected so that the potential induced in the control winding 18 and output winding 20 of coil 12 are substantially equal to and opposite to the potentials induced into the control winding 19 and the output winding 21 of coil 13 so that substantially no current will flow in either the input or the output circuit due to current flowing in the power windings 16 and 17 when no signals are applied to the input circuit. When a potential is applied between terminals 1 and 2 so as to cause a current to flow through the input or control windings 18 and 19, this current will unbalance the coils 12 and 13 so that potentials will be induced in both the input and output windings. In a preferred embodiment of this invention in which the cores are saturated during a portion of each half cycle of the current supplied by source 31, the predominant frequency of the potentials induced in these input and output circuits are harmonics of the frequency of source 31. The term "harmonic" as used in this specification and appended claims is synonymous with multiple, i. e., the second harmonic is the second multiple of or two times the fundamental frequency. In general, even harmonics such as the second, are preferred. The potential induced in the output circuit is used to cause current to flow through the demodulator 11 which comprises a bridge circuit of copper oxide rectifiers 26 as shown. Condenser 28 is provided to by-pass or provide a low impedance path for the higher frequency currents in the output circuit. The output current from this demodulator is of substantially the same wave form as that applied to terminals 1 and 2 and causes current responsive device 25 to operate.

Figure 2:
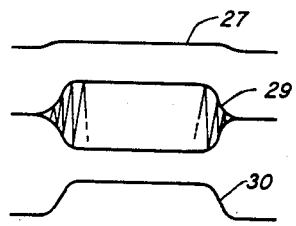
Fig. 2 shows various curves used to explain the operation of Fig. 1.

This is illustrated in Fig. 2 of which curve 27 represents an attenuated impulse as received over telegraph line 22 from battery 24 and transmitting contacts 23. This signal impulse of current is caused to flow through the control windings 18 and 19 of the modulator 10. This causes the modulator to become unbalanced so that a current as shown in curve 29 of Fig. 2 flows in the output circuit of modulator 10 through the demodulator 11 or copper oxide rectifiers 26. The output current from demodulator 11 has a wave form substantially as shown in curve 30 of Fig. 2 and causes current responsive device 25 to be actuated in accordance with it.

The gain of the amplifier from the input terminals 1 and 2 to the output terminals 7 and 8 is dependent upon first the gain of the magnetic modulator, and second upon the loss or gain of demodulator 11. A relatively large modulating gain is obtained from reactance modulators of the type shown in Fig. 1 while only a small demodulation loss occurs in demodulator 11 so that an appreciable overall gain may be obtained.

Although in general it is impossible to get a modulation gain from a two-terminal resistance modulator, on the contrary in the case of a reactive modulator such as a magnetic modulator, it is possible to realize a gain. This is due to the fact that the voltage across a modulating or non-linear resistance element is proportional to the current or to a function of the current through the element, while in the case of a reactive modulator the voltage across the non-linear reactive element is proportional to the time derivative of the current or to the time derivative of some function of the current, such as the flux density. In addition, it is possible under certain conditions to arrange the impedances of the associated circuits so that a negative resistance may be developed in the modulator. The gains referred to above do not include any gain which may be due to the negative resistance developed. However, as will be pointed out below this negative resistance tends to make the repeater unstable. That is, under certain conditions current will continue to flow in the output circuit after the input or signal condition has been removed from the input.

In general, the modulating gain of a reactive modulator, exclusive of the gain dependent upon the negative resistance is some function of the ratio or difference of the frequency of the current from source 31 and the signal frequency applied to terminals 1 and 2 of the modulator. In other words, the proportion of the output power supplied by the signal current and the proportion supplied by the carrier source 31 is a function of the difference in frequency or the ratio of the frequencies of these two currents. Thus, if the frequency of source 31 is very high compared to the signals applied to terminals 1 and 2 practically all of the power of the output circuit will be supplied from source 31 so that a very large gain may be realized in the modulator.

While demodulator 11 as shown comprises copper oxide rectifiers 26 it is to be understood that any suitable demodulator may be employed such as one using thyrite, vacuum tubes, gas-filled tubes or other non-linear resistance elements.

Figure 3:
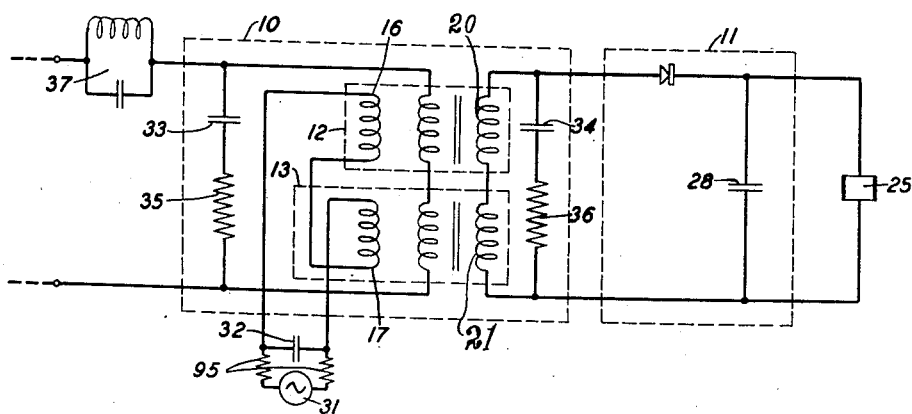
Fig. 3 shows various networks connected to the amplifier of Fig. 1 to improve its operation.

In order to increase the modulation gain of modulator 10 certain additional networks may be added as shown in Fig. 3. It has been found that harmonic voltages of a series of odd harmonics of the frequency of source 31 are generated in the primary or power supply windings 16 and 17 of coils 12 and 13 and that if the corresponding harmonic current is permitted to flow through these windings the gain of the modulator may be increased. It is therefore desirable to provide a low impedance path for these harmonics either through the generator 31 which should therefore have a low impedance to these harmonics or through some impedance network or element such as condenser 32 (see Fig. 3). Condenser 32 has a further advantage in case generator 31 is located a considerable distance from a number of amplifiers and supplies power to them over common leads which have some impedance represented by elements 95. In this case condenser 32 will prevent stray couplings between the various amplifiers due to the common lead impedance as well as provide a low impedance path to the harmonics of the carrier frequency current.

In addition, if a low impedance path is provided in either the input or output circuit for currents having a frequency of twice the frequency of source 31 the modulation gain is further increased. In Fig. 3 condenser 33 is connected across the input windings of coils 12 and 13 to tune the resultant circuit to twice the frequency of the power supply frequency. In addition condenser 34 has been shown connected across the output windings of coils 12 and 13. Both of these condensers are not necessary. Either one or the other may be provided or both may be provided, in which case, the combined capacity connected in these circuits should cause the coils to resonate at a frequency which is a harmonic of the frequency of the power source 31. In the preferred case this frequency is twice that of the power source. These condensers at times may cause a negative resistance to be developed within the coils 12 and 13 and thus make the amplifier unstable. To prevent this, resistances 35 and 36 are connected in series to condensers 33 and 34 respectively. These resistances limit the current flowing through the input or output windings and thus tend to stabilize the amplifier.

As shown in Fig. 3 the demodulator 11 comprises only a half-wave rectifier connected as shown. With this arrangement not only the output current of frequency 2P, where P is the frequency of source 31, flows through the output windings of coils 12 and 13 but also the low frequency output current which is similar in wave form to the current flowing through the input winding. For example, assume for the moment that a steady current or marking signal is being received. This causes a voltage of the harmonic of source 31 to be induced in the output windings 20 and 21 of the modulator coils. In a preferred embodiment of this invention this voltage is an even harmonic such as the second. The action of the half wave rectifier or demodulator connected in this output circuit is to demodulate this harmonic output and thereby cause an amplified and demodulated or direct current to flow in the output circuit of the amplifier. The output demodulated or direct current must also flow through the output windings 20 and 21 on the magnetic modulating coils. This direct current flows through the output windings in the direction which aids the magnetic field of the applied steady current flowing through the input windings of the magnetic modulating coils. The direct current thus flowing through the output windings of the modulator causes an increase in the output and thus tends to provide a feedback or regenerative action for the amplifier. In a similar manner, short demodulated signal impulses flowing in the output circuit of the amplifier also flow through the output windings of the modulator coils and provide a feedback or regenerative action for the entire amplifier and thus tend to increase the gain of the amplifier.

As pointed out above the voltage having frequency twice the frequency of the supply source 31 is induced in the control or input circuit of the amplifier. This voltage tends to cause alternating current of this frequency to flow over the incoming line and produce noise in and crosstalk from this line. In addition, changes in the line circuit which will effect the flow of this current tend to change the gain of the magnetic amplifier. To reduce or substantially eliminate these undesirable features an anti-resonant network 37 is connected in series with the input circuit. In a preferred arrangement this network is tuned to be "anti-resonant" at this frequency that is, so that it has a very high impedance to current of this frequency. Network 37 thus prevents this current from flowing in the input circuit as well as prevents changes in the impedance of the input circuit to currents of this frequency from materially affecting the operation of the amplifier.

Figure 4:
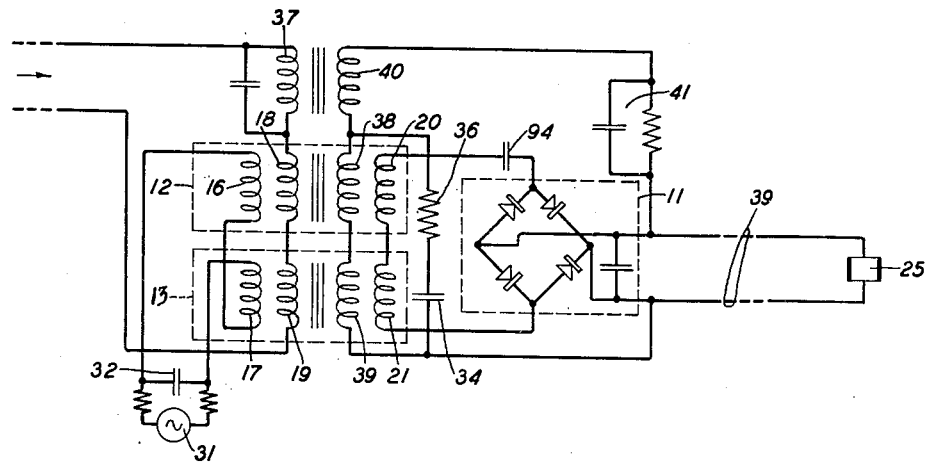
Fig. 4 shows a preferred method of feeding back a portion of the output of the amplifier to the modulator coils.

With the feed-back arrangement shown in Fig. 3 it is very difficult to adjust or control the amount of feed-back. The arrangement shown in Fig. 4 provides a more readily controlled feed-back circuit. As shown in this figure, coils 12 and 13 are provided with feed-back windings 38 and 39 respectively. These windings are connected in series and in series with winding 40, network 41 and the output of demodulator 11. When it is desired to increase the gain of the amplifier the feedback windings are connected to the output circuit in such a manner that the demodulated current flowing through them is in a direction to aid the magnetic effect produced by the input current flowing through the input windings. However, when it is desired to increase the stability of the amplifier the connections of the feedback windings are reversed so that the feedback current flows through these windings in a direction which produces magnetic effects opposing the magnetic effects produced in the cores by the input current flowing through the input windings. Since the wave shape of the output current may not be symmetrical and since it is very difficult to secure a balanced demodulator, a slightly higher demodulation voltage is generated during one-half cycle of the output current than generated during the other half cycle so some small or residual demodulated current tends to flow in output windings 20 and 21. A condenser 94 is therefore connected in series with the output windings to prevent circulation of this demodulated or rectified current in these windings. This condenser may also be used to secure series resonance in the output circuit.

In this figure condenser 34 and resistance 36 are shown connected across these feed-back windings and serve to tune the two coils to a frequency twice that of source 31. Since the input winding, the output winding and these feed-back windings are all closely coupled together it is immaterial to which set of windings this condenser and resistance are connected because it has the same effect on the gain no matter which set of windings it is connected to. In order to prevent second harmonic current of source 31 from flowing in the output circuit due to this feedback circuit a secondary winding 40 is provided on the core of the coil of network 37 which is tuned to suppress currents of this frequency. Network 41 is connected in series with the feedback circuit to control the feed-back current. This circuit operates similar to that shown in Fig. 3 except that the feed-back circuit is connected in parallel with the load or output circuit. In addition, the output circuit is shown connected to another telegraph line 39 over which the signal impulses are transmitted to cause operation of a current responsive device 25.

Figure 5:
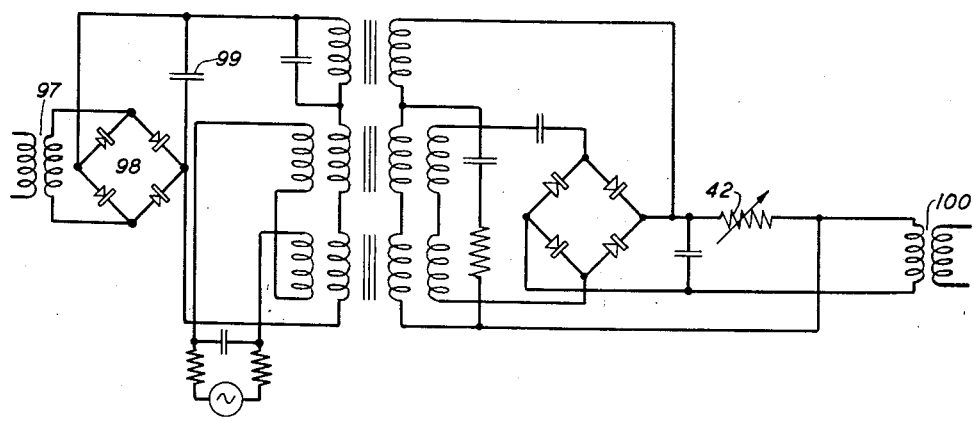
Fig. 5 shows another suitable feed-back arrangement.

Fig. 5 shows an amplifier similar to the one shown in Fig. 4. In Fig. 5 the amplifier is arranged to amplify higher frequency signals such as voice frequency currents. Here the control current may be supplied from some telephone circuit or equipment through transformer 97. In order to prevent the amplifier from doubling the frequency of the voice frequency current it is necessary to provide some biasing arrangement in the input circuit of the amplifier. The demodulator or rectifier bridge 98 connected in the input circuit provides a suitable bias arrangement because it insures that the voice frequency signal currents always pass through the input windings in the same direction. Condenser 99 is provided to increase the output of rectifier bridge 98.

The operation of the amplifier is similar to the operation of the amplifier shown in Fig. 4 except that the feed-back winding is connected across an impedance 42 in series with the output of the amplifier.

This feed-back arrangement may be desirable and has the advantage that the feed-back is dependent upon the load current. Thus, in cases where the load current varies appreciably the feedback may be also varied in accordance with the load current.

An output transformer is provided to remove any bias or direct current from the output which may then be connected to any suitable telephone system or apparatus.

Fig. 6 shows a very compact arrangement for the various coils in the modulator. Each core is composed of a box 44 of suitable material, such as porcelain, "Isolantite", "Bakelite", etc., in which magnetic material 45 is placed. When the modulator is connected in the first stage, it is desirable to use some high permeability material such as permalloy which requires a very low magnetic field to saturate it and has low losses. However, in case a high output is required, a material having a high saturation flux density such as silicon steel or hydrogenized silicon steel may be employed. In the case of the various alloys, commonly called "permalloy", it may be desirable to employ it in the form of a tape and then heat treat it after formed in the toroidal box. In this case the box structure should be of some material which will withstand the annealing temperatures required. If it is desired powdered magnetic material may also be employed and has the advantage of lower eddy current losses at extremely high frequencies which may be employed with these magnetic modulators.

Figure 7:
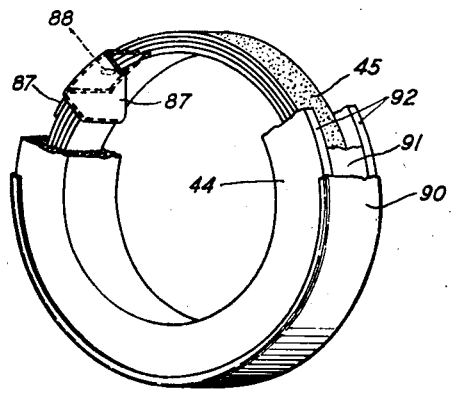
Figure 7A:
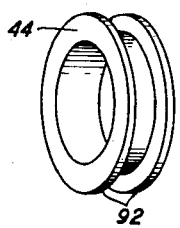
Figure 7B:
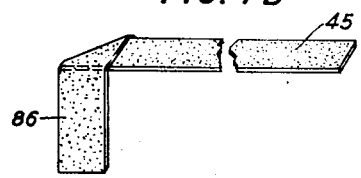
Figure 7C:
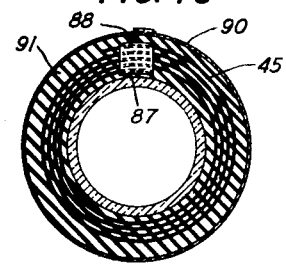

Fig. 7 shows a suitable structure for the cores. Here a thin tape of magnetic material 45 (see Figs. 7 and 7B) is covered with a refractory powder such as quartz dust and has its inner end 86 bent twice as shown so that plane of its surface is parallel to the edge of tape 45 and perpendicular to the surface of the tape. The powdered tape is then wound on the refractory form or spool 44. The inner end 86 is then again bent over on top of the outer end 87 and spot welded to it at 88 (see Fig. 7). The spool and tape are then heat treated to improve the magnetic properties of the tape. Some impregnating compound 91 (see Fig. 7C) which is very plastic at the temperatures at which the cores are used, such as "Vaseline" is put around the tape and the box sealed with a strip 90 which is glued or pasted to the edges 92 of spool 44. Strip 90 may be of any suitable material which is impervious to the impregnating material 91 such as impregnated paper.

This arrangement provides a core structure in which the magnetic material is firmly and permanently held in place without affecting its magnetic properties. In addition the flux is evenly distributed throughout the magnetic material due to the continuity of the magnetic path along the core strip and through the weld.

In assembling the modulator shown in Fig. 6 the power windings are applied to the individual cores or boxes 14 and 15. The cores are then put together and taped. The cores are superimposed one upon the other before taping so that the flux in one core, due to current flowing through the power winding, is in the opposite direction to the flux in the other core due to current flowing through the power winding of this other core. In the preferred embodiment of this invention the cores are reversed. That is, they are put together in such a way that with the alternate current flowing through the individual or power windings in the same direction, i. e., from inner to outer terminals, opposite potentials will be induced in windings wound upon the composite core structure of the two cores. Over the tape the output winding is applied as shown in Fig. 6. A third core 43 is wound with the winding of the coil of network 37. This coil then is put adjacent the other two coils and all taped together. Over this tape the input or control winding is wound as shown in Fig. 6.

This arrangement provides an input winding of lower resistance due to reduction in the length of wire required for a given number of turns on all the cores. Placing common windings on the three cores reduces the cost of winding the modulator.

Including the core of the retard coil within the input winding on the modulator cores greatly reduces the effective distributed capacity of the input winding. This may be explained by considering the relationship between the effective distributed capacity and elemental capacities comprising the distributed capacity of a winding. The effective distributed capacity of a winding is proportional to a summation of the capacities of individual turns to other parts of the coil multiplied by the square of the voltages difference across these elementary capacities. It is therefore important in reducing the effective distributed capacity to reduce the alternating voltages appearing between the various turns of the winding to as low a value as possible. Linking each individual turn of the modulator winding with the retard core results in adding to the voltage generated in each turn a nearly equal reversed voltage due to the reactance of the retard coil. Thus, where a common winding has been applied to the modulator and retard cores the alternating voltage at the terminals, which is the sum of the voltages of the individual turns does not increase appreciably as the number of turns is increased and the distributed capacity is therefore maintained at a low value because between any two chosen points of the winding and thus across any of the elemental capacities the voltage is small.

These coils are shown connected in an amplifier circuit similar to that shown in Fig. 3 with the exception that condenser 34 and resistance 36 are connected across the output circuit, it being impossible to accomplish any appreciable tuning with a condenser and resistance corresponding to resistance 35 and condenser 33 across the input circuit as shown in Fig. 3.

It is also possible to arrange these amplifiers to amplify carrier current signals. Such an arrangement is shown in Fig. 8. In this case the frequency of the source 31 should be chosen so as to be just one-half the carrier frequency of the channel to which the output of the amplifier is connected. As shown in Fig. 8, for carrier current operation it is necessary to place the demodulator before, or in the input circuit of the magnetic modulator. In Fig. 8 signals are received from a carrier system through a frequency discriminating network or receiving filter 48 and are then applied to a balanced demodulator comprising a bridge circuit 50 which demodulates the carrier current signals and applies them to the input or control winding of the modulator. The output circuit of the modulator is connected through the transmitting filter to a carrier system. In this figure another arrangement is shown for increasing the output of the modulator. In this case inductance 46 and capacity 47 are connected in series with the output circuit and are used to tune the output circuit including the modulator coils to a frequency of the carrier current which is twice the frequency of source 31. It should also be noted in this figure that the carrier frequency generated in the control winding due to the modulator action is balanced out of the input circuit by means of the demodulator bridge 50. Fig. 8A shows a slightly different demodulator in which the input voltage applied to the control windings is doubled. Fig. 8B shows another input demodulator arrangement which employs a tapped transformer to secure full-wave demodulation.

In Fig. 8A carrier current which flows through the demodulator due to the modulator action of the coils may not be entirely balanced out of the input circuit. In this case the input or receiving filter which is ordinarily used in carrier circuits prevents such current from flowing in the input line.

It should also be noted that the input demodulators shown in Figs. 8, 8A and 8B also provide some regeneration for the magnetic amplifiers. As pointed out before when current flows through the input winding due to a received signal being demodulated by demodulator 50 it causes a voltage to be induced in both the input and output windings having a frequency which is an even multiple such as twice the frequency of source 31. This second harmonic potential induced in the control winding is supplied to demodulators 50 and the corresponding demodulators shown in Figs. 8A and 8B. The magnitude of this potential may be controlled to some extent by the inductance and capacity connected to the input circuit as shown in Fig. 8. Demodulator bridge 50 will demodulate current due to this potential and cause it to be added to the demodulated signal current received through receiving filter 48 thus providing some regeneration or feed-back.

In case it is desired to provide a better feed-back control arrangement than that provided in Figs. 8, 8A or 8B feed-back arrangements similar to that shown in Fig. 4 may be employed. Such an arrangement is shown in Fig. 9. In this case a demodulator 11 is required to supply the energy to the feed-back circuit. Otherwise, this circuit shown in Fig. 9 operates in a manner very similar to the circuits shown in Figs. 4 and 8.

Fig. 10 shows a two-stage magnetic amplifier developed for monitoring on 1000 cycle signaling impulses. In this case only an essentially voltage input is available. Since the magnetic amplifier requires an input current for operation the signals are applied to the input circuit of the vacuum tube 51 where they are amplified so sufficient current is available to actuate the magnetic amplifier. They then pass through a two-stage magnetic amplifier and operate an output relay 52.

Fig. 11 shows a magnetic amplifier connected to a submarine cable and adapted to receive polar telegraph signals. The magnetic amplifiers in the foregoing figures have been adapted to receive only non-polar signal impulses, that is, impulses of current or no current. The curve A, B, A' of Fig. 12 shows the output current versus control or input current. As seen in this curve as the input current is increased from zero to some point such as A, the output remains substantially zero. However, when point A, hereinafter referred to as the "threshold" value of input current, is exceeded, the output rises rather rapidly to point A' after which the output remains substantially constant with an increase in the input or control current. In the absence of any regeneration, the output follows a similar curve shown dotted in Fig. 12, a, b, a' as the control or input current increases from zero negatively. Thus when a full wave rectifier is utilized in the output circuit, the output circuit does not differentiate between positive or negative impulses of current supplied to the input circuit.

If, however, regeneration is present in the amplifier the output current varies as shown in the line O to D when the input or control current increases from zero negatively. Under this condition the amplifier responds only to currents or impulses of one polarity. If, however, a permanent bias is applied to the input or control circuit so that the amplifier operates at or about a point B the output will fall from point B when the combined control current and bias decreases or becomes negative from point B and the output current increases as the combined input or control and bias current increases or becomes positive. In Fig. 11, fourth windings 56 and 57 have been added to coils 12 and 13 respectively. These windings are connected through coil 53, milliammeter 58, resistance 59 to battery 60. This provides means for applying and adjusting the bias to these coils so that they operate at a point such as B in Fig. 12 to repeat both positive and negative signal impulses.

Curve 100 of Fig. 13 shows the form of signal impulses received from the submarine cable 96 (see Fig. 11) after which, having passed through a frequency discriminating network such as shaping or equalizing network 62, are applied to the input or control circuit of the first stage 65 of the magnetic amplifier. Curve 101 of Fig. 13 shows the output current of the magnetic modulator which varies in accordance with these applied polar signal impulses, that is, both positive and negative impulses. Curve 102 shows the form of the signal impulses as received from demodulator 11. In curve 103 the constant bias has been balanced out so that the signals are substantially the same as received except that they have been amplified and have an improved wave form. The signals then pass through additional stages 63 and 64 which are similar to the stage shown within the dotted line 65. The output may then be employed to actuate any suitable telegraph apparatus.

Fig. 14 shows an alternative arrangement for receiving and amplifying polar signals. In this figure two magnetic amplifiers are provided. One of these amplifiers is employed to receive and amplify signal impulses of one polarity while the other amplifier is employed to receive and amplify signal impulses of the other polarity. A rectifier 66 is connected in the input circuit of the upper amplifier in such a manner as to permit signal impulses of one polarity to pass through this input circuit. This amplifier circuit, including the feed-back arrangement, is arranged to amplify signal impulses of this polarity. Rectifier 67 is connected in the input circuit of the lower amplifier in the opposite direction so as to permit signal impulses of the opposite polarity to flow in the control circuit of this lower amplifier which is arranged to amplify these impulses. A frequency discriminating network or filter network 68 is connected in series with the input line to prevent undesirable current due to the action of this amplifier from flowing in this line. The output of both of these magnetic amplifiers is shown connected directly to an outgoing line through a filter network 69 similar to that in the incoming line 68. Instead of connecting the output of the amplifier directly to an outgoing line it may be connected to any other signal responsive apparatus such as relays 85 and 86 as shown in Fig. 14A.

The circuit of Fig. 15 shows a preferred form of magnetic amplifier for repeating and amplifying telegraph signals of both positive and negative polarities. The input signal is applied to two pairs of modulator cores without the use of rectifiers. Polarity discrimination is obtained by use of biasing currents applied to the input windings through resistances 101 and 102 from battery 103. The magnetomotive force of this biasing current aids the magnetomotive force of signal currents in the upper magnetic amplifier circuit and opposes the magnetomotive force of the signal current in the lower magnetic amplifier circuit for positive signal impulses and vice versa for negative signal impulses. The biasing current may be adjusted to a suitable value, preferably so that its magnetomotive force exceeds the combined maximum signal and feedback magnetomotive forces.

Fig. 15B illustrates the manner in which the bias in the circuit shown in Fig. 15 is adjusted and the manner in which the two amplifiers respond to input currents. Curve A shows how the output of the upper amplifier varies with input. Curve B shows how the output of the lower amplifier varies with input. Curve C shows the combined output of both amplifiers in relation to the input. As will be noted from curve C this circuit arrangement is suitable for amplifying, without appreciable distortion, currents other than telegraph signal currents or impulses.

Fig. 15A shows an alternative arrangement for connecting the control windings and for supplying a suitable bias. In this figure rectifiers 104 are used as an additional means of directing impulses of one polarity to one amplifier and impulses of another polarity to another amplifier.

The outputs of the two amplifiers shown in Fig. 15 are combined in an improved circuit arrangement employing impedances 109, 110 and 111. In this circuit the impedance in series with each output is reduced and the reverse potential applied to the output circuit of one amplifier by the other amplifier is also reduced. In this figure the networks 32 are tuned and offer low impedance to the third harmonic of the frequency of source 31.

The amplifiers shown in Fig. 15 are shown connected in a telegraph system having a transmitter 105 of any suitable type. The signals then pass through relay 106 and telegraph composite sets and lines 107 through the frequency discriminating or shaping network 62 to the input circuit of the amplifier. The amplified signals from the amplifier pass through the shaping network 62A, composite sets and telegraph lines 108 to any suitable telegraph receiver 112.

Fig. 16 shows an arrangement for providing automatic volume control or level compensating. In this figure, carrier current signals are received through the receiving filter of a channel and are amplified by a two-stage magnetic amplifier. The amplified signal impulses then actuate relay 113. Impulses of current received through the receiving filter operate relay 113 which repeats the impulses to the current responsive device 25. Relay 113, in operating, releases relay 114 which connects the condenser and grid of tube 116 to the input circuit of the amplifier through rectifier 117. The applied impulses cause a voltage of twice the frequency of source 31 to be generated in the input coils of the amplifier as hereinbefore described. The higher the input signal current impulses the higher this induced voltage. This voltage is then caused to charge condenser 115 during the impulses of current to a value corresponding to the voltage induced in the input of the amplifier having a frequency of twice the source 31. During impulses of no current, relay 113 releases and operates relay 114 which disconnects condenser 115 from the input circuit of the amplifier and prevents condenser 115 from rapidly discharging. The output current of tube 116 is controlled by this charge on condenser 115 and therefore by the amplitude of the received signal impulses. This current from tube 116 flows through the left-hand winding of relay 113 to adjust the bias of this relay in accordance with the amplitude of the received signals. The output current of tube 116 also flows through the power windings and biases of the first-stage of the magnetic amplifier to adjust the gain of the amplifier in accordance with the amplitude of the received current impulses.

Fig. 16A shows an additional method of adjusting the gain of the amplifier. Condenser 118 and two rectifiers 117 are connected across the input of the amplifier. The output current of tube 116 flows through these rectifiers and changes the impedance of this shunt in accordance with the amplitude of the received signal impulses.

Thus the gain of the amplifier is automatically adjusted in accordance with the amplitude of the received signal currents. If it is desired, one gain regulating circuit including tube 116 may be provided for a group of amplifiers and used to vary the gain of all the amplifiers connected to it.

As pointed out above, magnetic amplifier circuits of the types described herein become unstable with excessive feed-back or regeneration so that it is equivalent to a two-position relay which is stable only in either one or the other position. A two-position relay of this type is shown in Fig. 17. In this figure a source of alternating current 31 is connected to the power windings 16 and 17 of coils 12 and 13 respectively. The output is connected through a transformer having windings 70, 71 and 72 and a demodulator 11 to the signal responsive device 25 connected to the output terminal 4. Any suitable signal responsive device 25 may be connected to this terminal.

Feed-back is obtained through coils 20 and 21 from the output to ground connected to coil 21. In a non-operated position the relay is stable, since it requires a certain potential in excess of some critical "threshold" value to unbalance the coils. When such a potential in excess of this critical value is applied to terminal 3 it will cause current to flow through the input or control windings 18 and 19 of coils 12 and 13 and cause an output current to flow in the output coils 20 and 21. This current is connected through transformers having windings 70, 71 and 72 to the demodulator 11. A portion of the demodulated current is fed back through coils 20 and 21 as pointed out above and causes the coils to remain permanently unbalanced so long as this output current flows through windings 20 and 21. When it is desired to release or restore the circuit to its normal condition, the feed-back current through coils 20 and 21 may be reduced to zero by momentarily applying ground to terminal 5 which short-circuits windings 20 and 21. This allows the balance to be restored between coils 12 and 13 so the circuit is returned to its normal condition.

Fig. 18 shows a similar arrangement except that in this arrangement all that is necessary to restore the circuit to normal is to interrupt the circuit of the current responsive device 25 connected to the output terminal 4. In this circuit, this interrupts the feed-back current flowing through windings 20 and 21 and thus causes the circuit to be restored to normal.

Fig. 19 shows a group of storing devices, 73, 74, 75, etc. connected to a distributor D which may be either a multiplex distributor or a start-stop distributor. The input terminals 3 of these storing devices are connected to segments 79 of distributor D. Brush 76 then connects these segments to ring 78 which in turn is connected to the output of amplifier 82. Prior to brush 76 connecting the input terminals of any storing device to amplifier 82 brush 77 connects ground to terminal No. 5 and thus restores the magnetic storing devices to their unoperated condition. The output of these magnetic amplifiers are shown connected to other distributor rings which may be in turn connected to signal responsive devices such as printer magnets or to an outgoing line 83 to current responsive devices 84 at some distant station. As shown in this figure the magnetic storing devices 73, 74 and 75, etc., serve to regenerate signals received through amplifier 82 and retransmit them over line 83.

In the preceeding description various features of magnetic amplifiers have been described and it is to be understood that these features may be used in various combinations to secure the desired results. For example, the automatic volume control shown in Fig. 16 or 16A may be applied to magnetic amplifiers shown in other figures.

What is claimed is:

1. A magnetic device comprising a plurality of magnetic cores, an input circuit wound thereon, an alternating current power supply winding wound on said cores the current of which at least partially saturates said cores, output windings wound on said cores, a demodulator connected to said input circuit and a second demodulator connected to said output windings, feed-back means including said second demodulator.

2. A magnetic amplifying device comprising two toroidal cores of magnetic material, a winding individual to each of said cores, said cores being superimposed one upon the other so that the flux in one core due to current in its individual winding is in the opposite direction to the flux in the other core due to its individual winding, windings common to said cores, a third toroidal core similar to said first two toroidal cores, windings individual to said third core, said third core being positioned adjacent said first two cores, and windings common to all of said cores.

3. A magnetic device comprising a plurality of saturable cores, alternating current power supply windings wound on said saturable cores, a source of alternating current connected to said windings, the alternating current from which flowing through said windings is of sufficient magnitude to saturate each of said cores during a part of every half-cycle of said alternating current, an input circuit having turns wound about said cores, an output circuit having turns wound about said cores and demodulating apparatus connected to one of said circuits.

4. A regenerative magnetic amplifier comprising a plurality of saturable cores, alternating current power supply windings wound on said cores, a source of alternating current connected to said windings, said source causing a current to flow through said windings of sufficient magnitude to saturate each of said cores during a part of each half-cycle, an input circuit including turns interlinking all of said cores, an output circuit including turns interlinking all of said saturable cores and demodulating and regenerative means connected to one of said circuits.

5. A magnetic device comprising a pair of saturable cores, power windings wound on each of said cores, a source of alternating current connected to said windings the current of which is of sufficient magnitude to saturate both of said cores during a portion of every half-cycle of the alternating current, balanced input windings wound on said cores having two substantially equal and opposite voltages included in them, balanced output windings wound on said cores also having two substantially equal and opposite voltages induced in them, means for applying impulses to said input windings which unbalances said cores and causes harmonic voltages of said source to be induced in said input and said output windings, and demodulating means connected in one of said circuits.

6. A magnetic amplifier comprising a plurality of saturable cores, alternating current power supply windings wound on said cores, a source of alternating current connected to said windings, said source of current being of sufficient magnitude to cause said cores to be saturated during a portion of each half-cycle of the alternating current, input and output windings wound on said cores, and a half-wave unilateral conducting device connected in said output circuit for demodulating the output of said amplifier and for regenerating said amplifier.

7. A magnetic amplifier comprising a plurality of saturable cores, alternating current power supply windings wound on said cores, an input circuit including windings wound on said cores, an output circuit including windings wound on said cores, and demodulating means connected to said output circuit and regenerative means connected in parallel with said output circuit.

EVERETT T. BURTON.